United States Patent [19]

Yoshida

[11] Patent Number: 5,253,163

[45] Date of Patent: Oct. 12, 1993

[54] ELECTRONIC CASH REGISTER

[75] Inventor: Eiji Yoshida, Nara, Japan

[73] Assignee: Sharp Kabushiki Kaisha, Osaka, Japan

[21] Appl. No.: 530,828

[22] Filed: May 30, 1990

[30] Foreign Application Priority Data

May 31, 1989 [JP] Japan .................. 1-140124

[51] Int. Cl.$^5$ ............................................. G07G 1/12
[52] U.S. Cl. .................................................. 364/405
[58] Field of Search ............................. 364/405, 401

[56] References Cited

U.S. PATENT DOCUMENTS

| | | | |
|---|---|---|---|
| 4,396,985 | 8/1983 | Ohara | 364/405 |
| 4,493,037 | 1/1985 | Takano et al. | 364/405 |
| 5,018,166 | 5/1991 | Yagi | 364/405 |

FOREIGN PATENT DOCUMENTS

| | | |
|---|---|---|
| 54-37951 | 11/1979 | Japan . |
| 57-202159 | 1/1982 | Japan . |
| 57-203167 | 11/1982 | Japan . |
| 60-11992 | 1/1985 | Japan . |
| 61-251958 | 11/1986 | Japan . |
| 2054230 | 11/1981 | United Kingdom . |
| 2152723 | 7/1985 | United Kingdom . |

Primary Examiner—Roy N. Envall, Jr.
Assistant Examiner—Xuong Chung
Attorney, Agent, or Firm—David G. Conlin; George W. Neuner

[57] ABSTRACT

The electronic cash register stores monetary transaction information for each guest in the first memory by entering it with the input means, and when a totalization operation is specified by the first specifying means, the electronic cash register sums up the amount of money stored in the first memory and adds a result of the calculation to the data in the second memory. When entering monetary transaction information for a guest is temporarily ended and there is possibility of reentering the transaction information, the cash register keeps the transaction process in the temporary totalization state, namely, keeps the data stored in the first memory without clearing it as summing up the amount of money stored in the first memory and adding its calculation result to the data in the second memory, and then, when an additional registration is specified by the third specifying means, the cash register subtracts the calculation result in the first memory from the value stored in the second memory, and stores the additionally registered transaction information from the input means in the first memory as an additional registration. Accordingly, when registration of its additional order is performed in a restaurant after registration of a new order was performed, the cash register can print both monetary transaction information of a new order and its additional order together on a single slip on the basis of the data stored in the first memory.

4 Claims, 7 Drawing Sheets

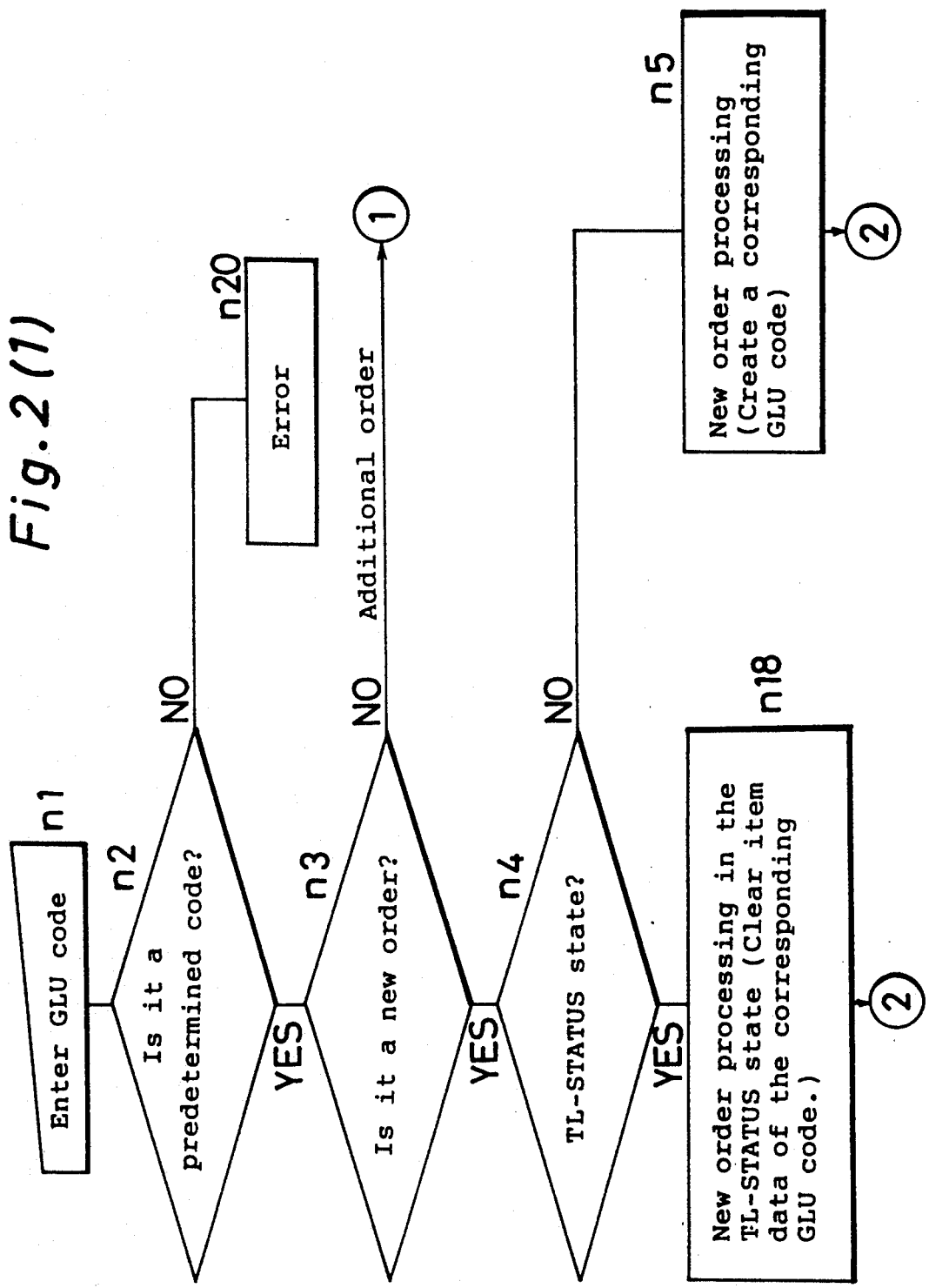

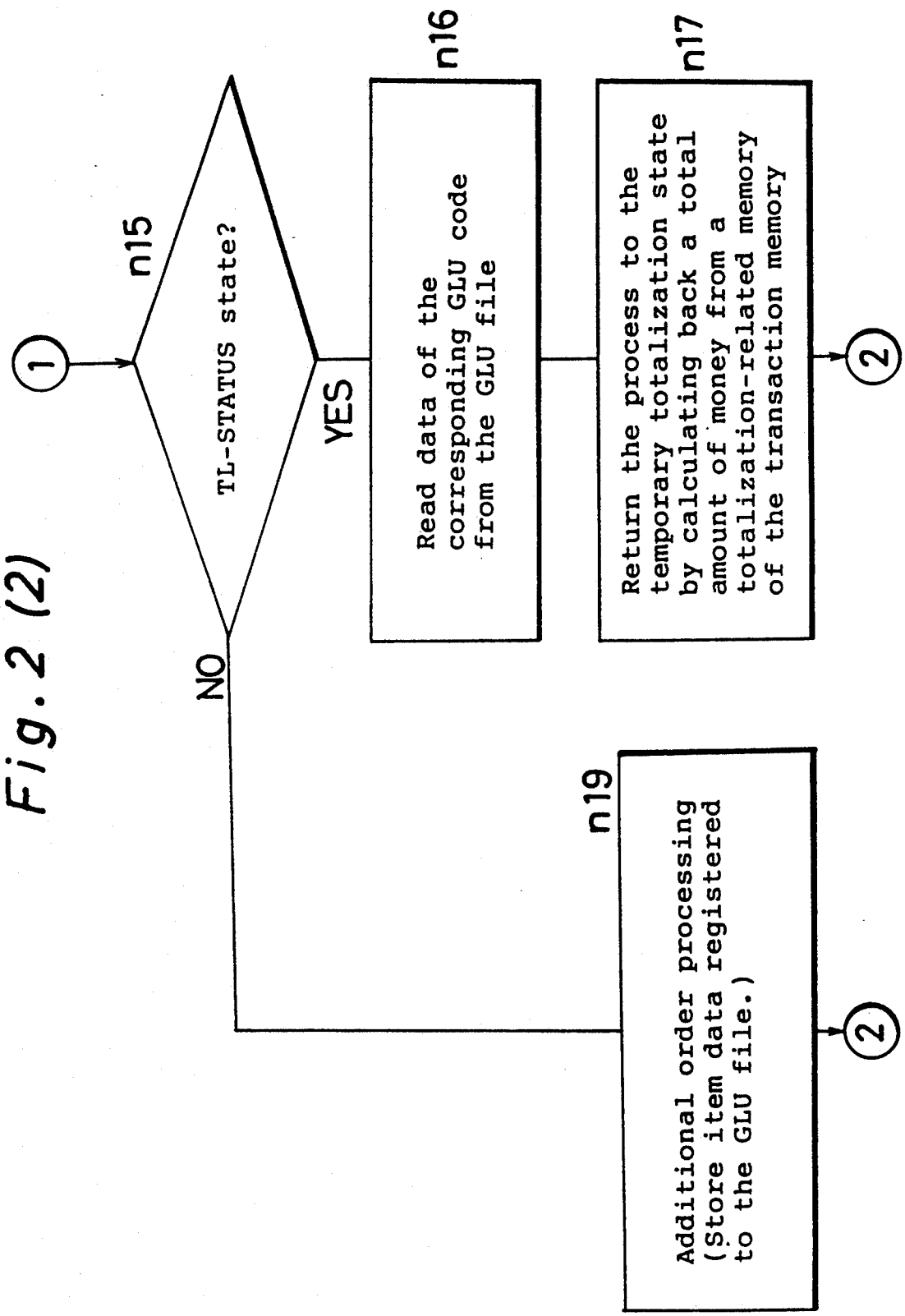
Fig. 2 (2)

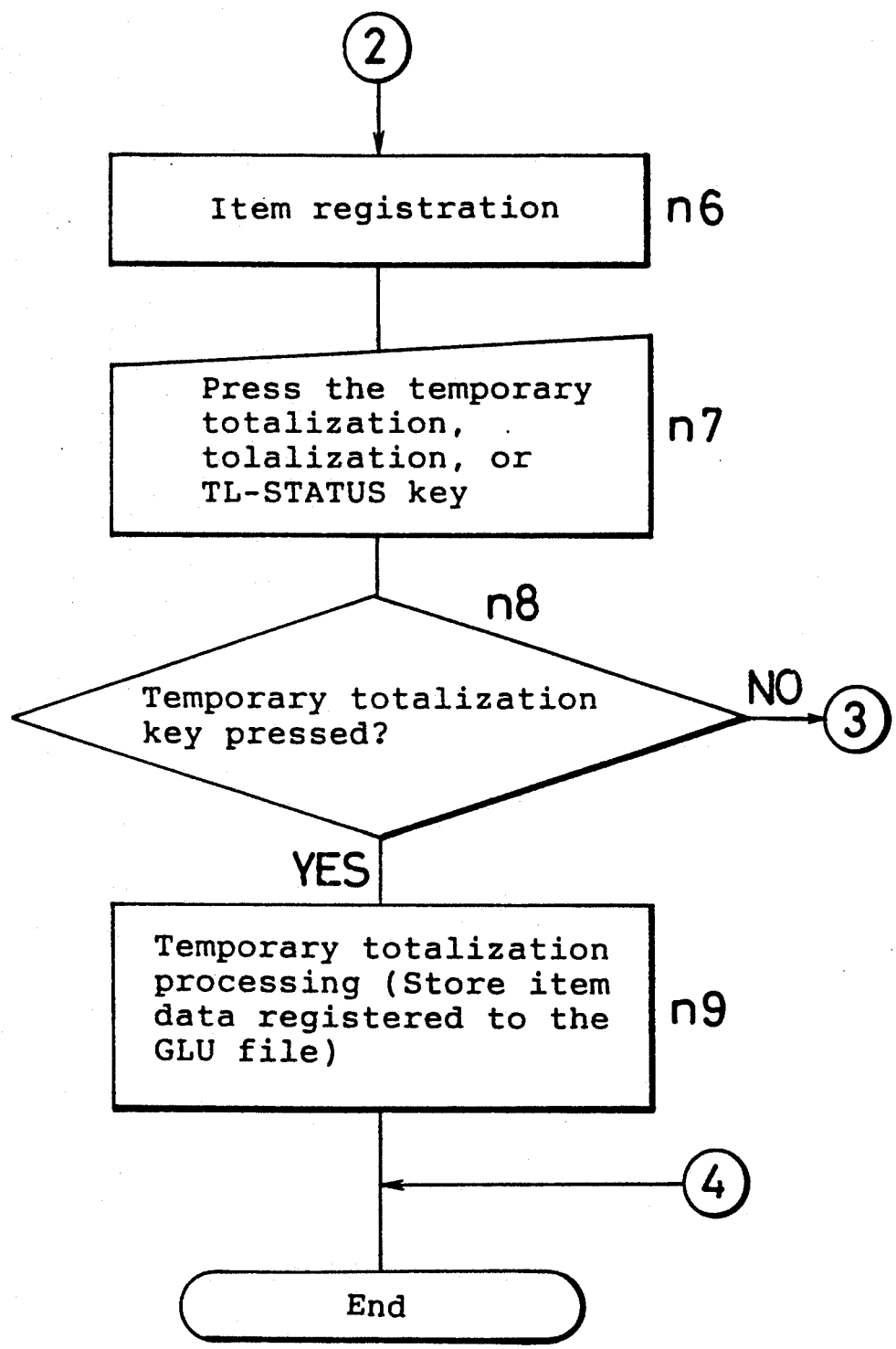

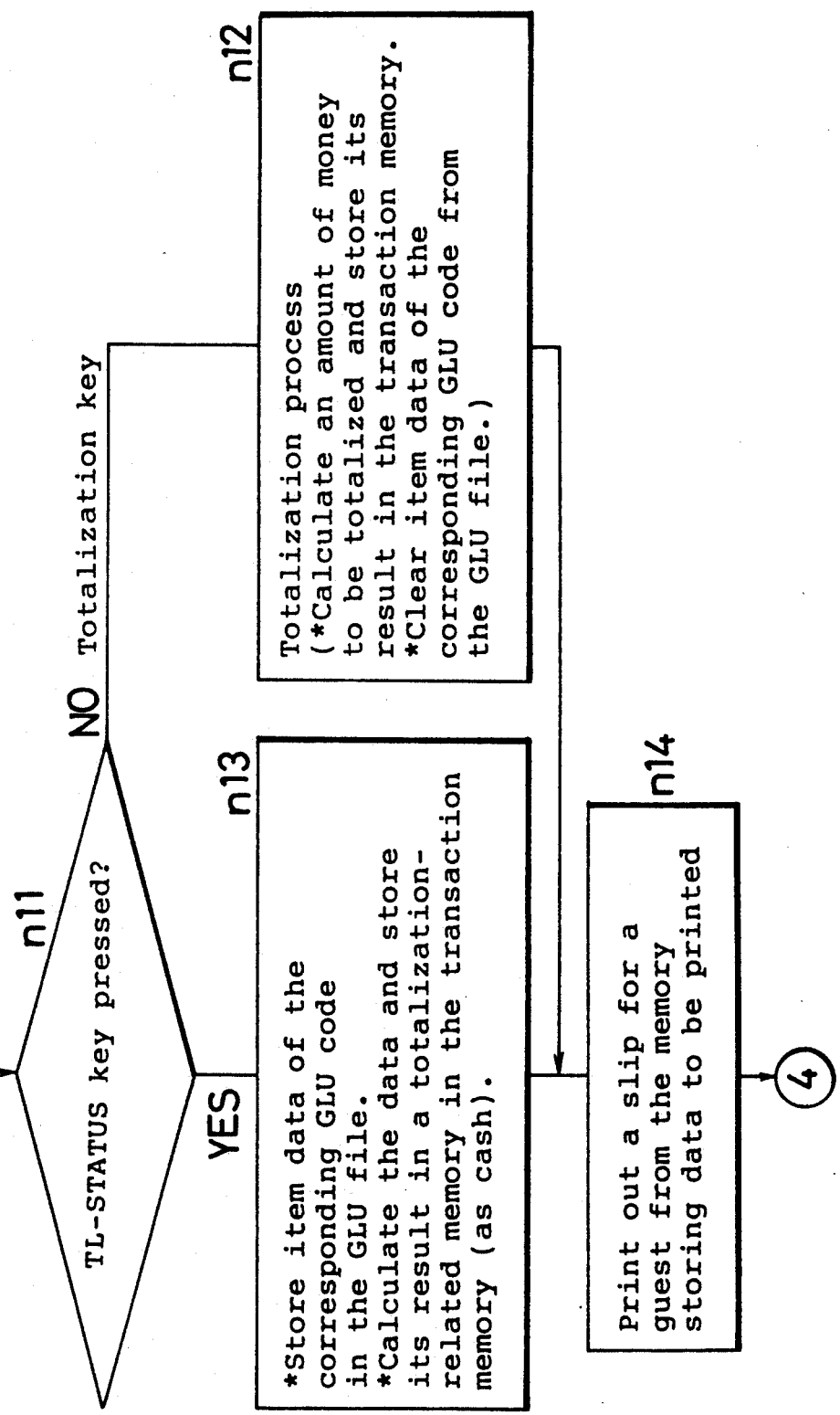
Fig.2 (4)

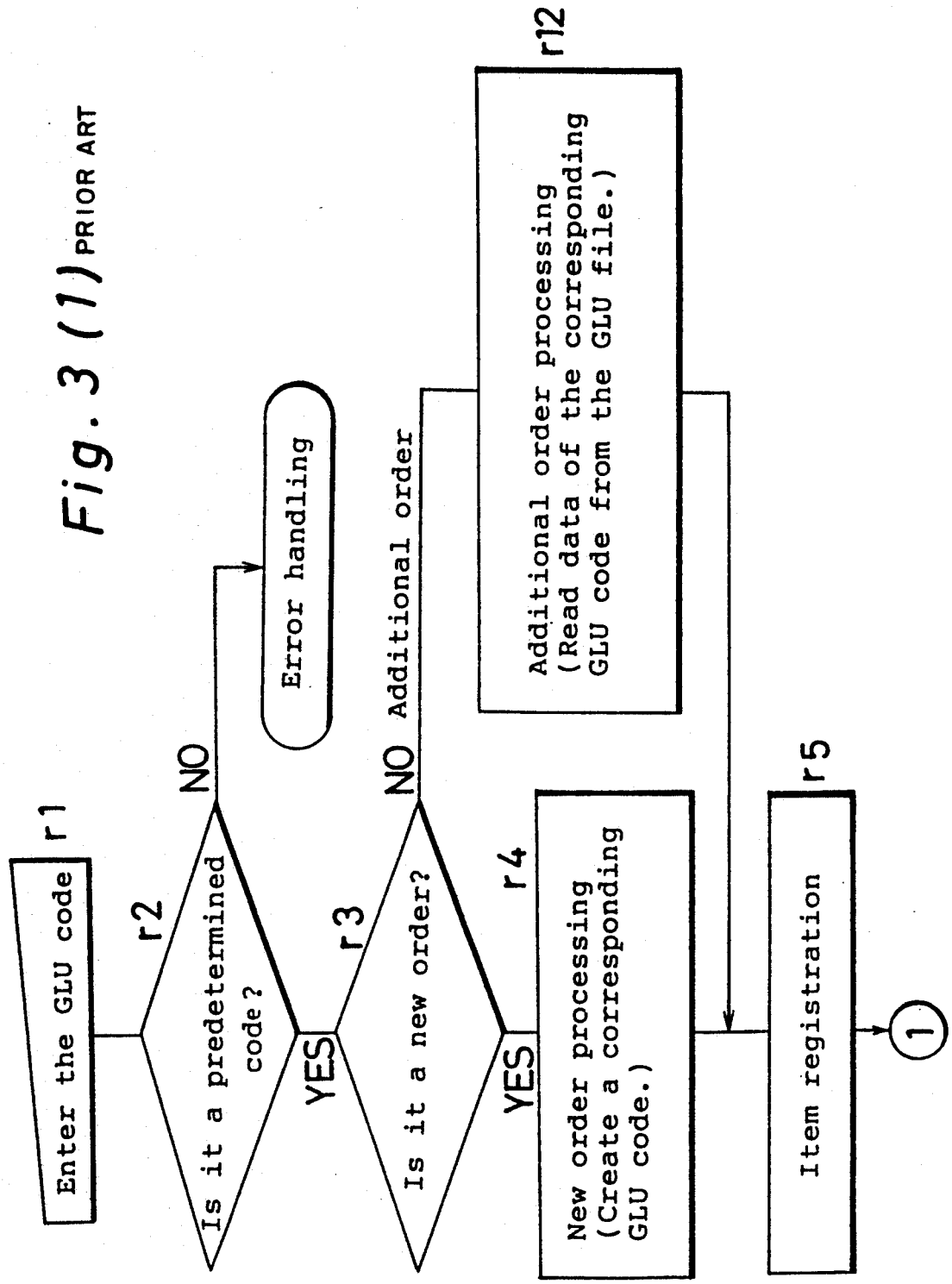
Fig. 3 (1) PRIOR ART

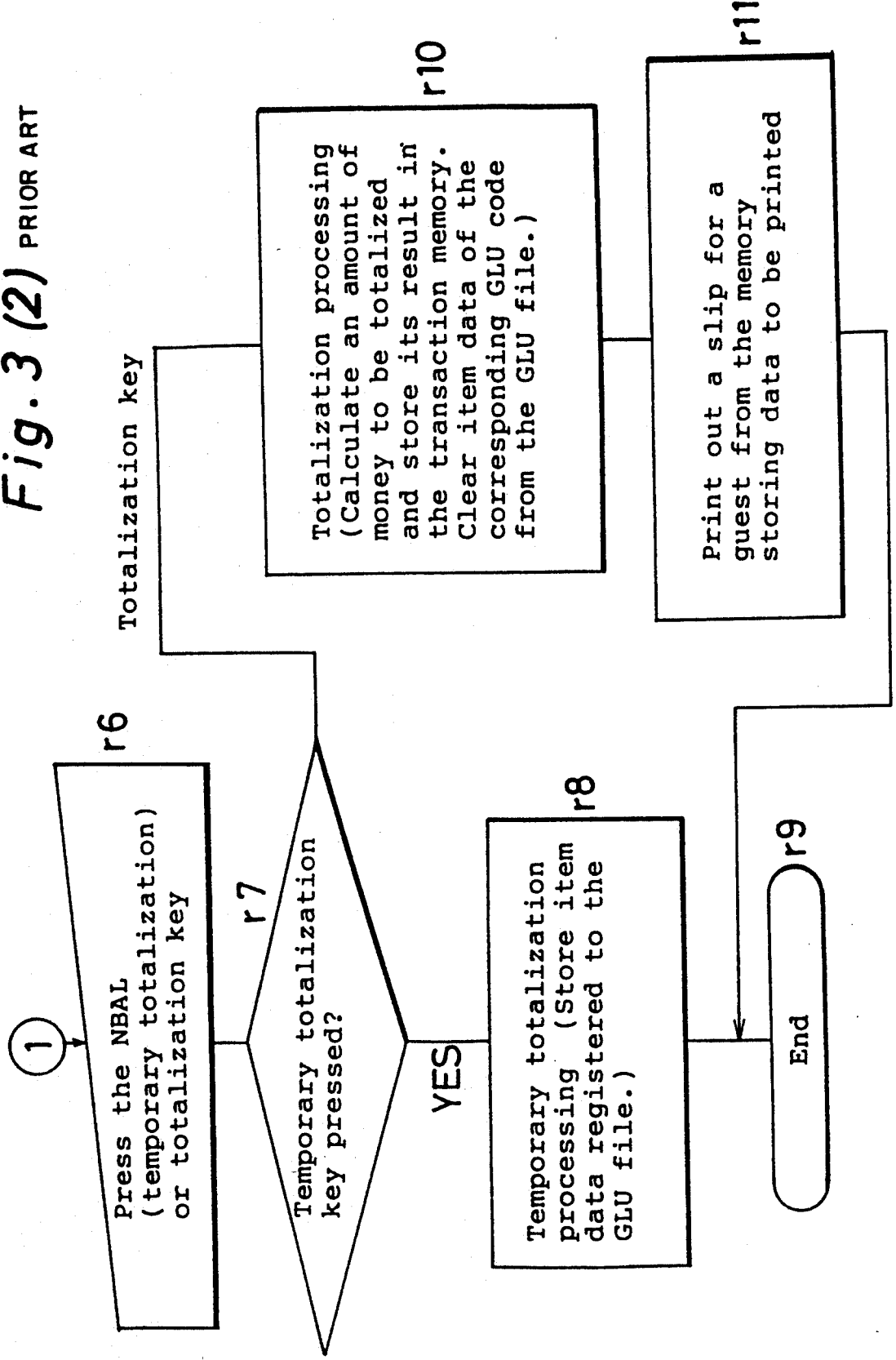

ELECTRONIC CASH REGISTER

BACKGROUND OF THE INVENTION

1. Field of the Invention

The present invention relates to an electronic cash register which can be preferably embodied so as to make a monetary transaction processing for each guest in hotels, restaurants, and the like.

2. Description of the Prior Art

A typical example of the prior art is described below as referring to FIG. 3(1) and 3(2). An electronic cash register stores a predetermined code for each guest in its Guest Look Up (GLU) memory. Referring to FIG. 3 (1), when in step r1 a guest code is entered into the electronic cash register in a restaurant or the like, in step r2 it is determined whether or not the guest code is one of the codes stored in the memory in advance, and if it is, the process goes to step r3, in which it is determined whether or not the transaction relates to a new order. If it relates to a new order, the process goes to step r4 to make an input processing for the new order and to create a storing area of the memory corresponding to the GLU code of the guest, namely, to bring the process into a state in which the transaction information and the like can be stored in the memory. In step r5 registration of items is performed, namely, kinds and prices of the ordered items are entered through input means. In step r6 showing FIG. 3(2), a temporary totalization NBAL key is pressed for processing a transaction for another guest, or a totalization key is pressed for processing payment of that guest.

In step r7 it is determined whether or not the processing is a temporary totalization, and if it is so, the process goes to step r8 to make the temporary totalization. In the temporary totalization, the item data registered to the GLU file which is a storing area corresponding to the guest code is kept stored.

When in step r7 it is determined that the processing is not a temporary totalization, namely, the totalization key is pressed, the process goes to step r10 to make a totalization. The totalization processing adds a totalized amount of money to the data in the transaction memory storing a total amount of money for each guest and at the same time the item data of the corresponding GLU code of the guest is cleared from the GLU file. In step r11 a slip for the guest for whom the totalization processing has been performed is printed out from the memory storing data for printing.

When it is determined that the processing is not a new registration but an additional one in step r3, the process goes to step r12 (refer to FIG. 3(1)) to perform an additional registration "RE-ORDER" processing. This processing reads the data from the GLU file which is a storing area corresponding to the entered guest's GLU code, and the process goes to step r5 to make an item registration.

In the prior art, in short, a monetary transaction processing to make a Guest Look Up (GLU) operation makes a new or additional registration, the temporary totalization input operation stores guest's order data in the GLU file, and the totalization input operation clears the data in the GLU file and prints a slip for the guest with a printer.

In such prior art as this, in case that after a totalization input operation is made in step r6 and a totalization processing for a guest has been already performed to print a slip in steps r10 and r11, the same guest makes an additional order, the process must return to step r1 to start with a new registration; and as a result a slip only for the additional order is printed. This causes inconvenience that a slip on which a charge for the additional order is added to the amount of money printed on the previous slip cannot be issued.

SUMMARY OF THE INVENTION

An object of the present invention is to provide an electronic cash register which can make use of the transaction information registered earlier for making an additional registration so that it may give convenience in use.

The invention provides an electronic cash register comprising:

input means for entering monetary transaction information for each guest;

a first memory to store transaction information for each guest;

a second memory to store a total amount of money for each guest;

first specifying means for specifying a totalizing operation;

second specifying means for specifying the process to be kept in a temporary totalization state;

third specifying means for specifying an additional registration;

and control means which (a) makes a monetary transaction processing by summing an amount of money stored in the first memory in response to output of the first specifying means, adds a result of the processing to the data in the second memory, and then clears contents stored in the first memory, (b) makes a monetary transaction processing by summing an amount of money stored in the first memory in response to output of the second specifying means, and keeps the data stored in the first memory, and (c) subtracts a result of the processing in the first memory from the value stored in the second memory in response to output of the third specifying means and makes an additional registration of transaction information from the input means on the first memory.

In the invention the input means is provided with guest code input keys 6 to enter a code for identifying a guest and item registration keys 7 to enter monetary transaction information;

the control means stores monetary transaction information entered by pressing the item registration key 7, corresponding to a guest code entered into the first memory by pressing the guest code input key 6 in response to output of the input means;

the first memory contains a flag 14 to indicate the transaction information for a guest is kept in the temporary totalization state;

the control means turns on the flag to indicate the temporary totalizing state is kept in response to output of the second specifying means, subtracts a result of the calculation in the first memory from a value stored in the second memory in response to output of the third specifying means when the flag is turned on in response to output of the third specifying means, and makes an additional registration of the transaction information from the input means on the first memory; and printing means provided by the invention prints on a single slip both monetary transaction information stored in the first memory before specifying the temporary totalization state through the second specifying means and another monetary transaction information stored in the first memory after specifying an additional registration through the third specifying means.

According to the invention, on the basis of output of the first specifying means such as the Totalization key or the like which specifies totalization, the electronic cash register sums up a transacted amount of money stored in the first memory for each guest to calculate the monetary transaction, for example, to calculate the amount of a tax or the like, adds the calculation result to a total amount of money for the guest, and then clears the data stored in the first memory to finish the transaction processing.

According to the invention, in particular, the electronic cash register is provided with the second means for specifying the process to be kept in the temporary totalization state, calculates the monetary transaction by adding the amount of money stored in the first memory and adds the calculation result to the data in the second memory, and keeps the stored data of the transaction information in the first memory as it is stored without clearing, when entering the transaction information for a guest is temporarily suspended with possibility of reentering data by an additional order. After this, when an additional registration is specified by the third specifying means, the electronic cash register subtracts the calculation result in the first memory from a value stored in the second memory. This returns the process to the state equivalent to a state in which the first specifying means is not operated for the guest. This state allows the transaction information from the input means to be additionally registered into the first memory. Termination of the transaction after such an additional registration may be performed by specifying the totalization through the first specifying means, or may also be performed by bringing the the process into the temporary totalization state through the second specifying means when there is possibility of reentering some transaction information for an additional registration.

According to the invention as described above, when there is possibility of reentering some transaction information after temporary termination of entering monetary transaction information for a guest, to keep the process in the temporary totalization state through the second specifying means and then specify an additional registration through the third specifying means makes it possible to resume entering monetary transaction information through subtracting the calculation result of the transaction information stored in the first memory from a total amount of money for each guest in the second memory.

Accordingly, for example, in restaurants and the like, when making a registration of its additional order after registration of a new order, the electronic cash register can print monetary transaction information for both a new order and its additional one on a single slip to issue it, so that it may give convenience in use.

BRIEF DESCRIPTION OF THE DRAWINGS

Other and further objects, features, and advantages of the invention will be more explicit from the following detailed description taken with reference to the drawings wherein:

FIGS. 2(1)–2(4) are a flowchart for describing operation of the embodiment of the invention shown in FIG. 1; and FIGS. 3(1) and 3(2) are a flowchart for describing operation of the prior art.

DETAILED DESCRIPTION OF THE PREFERRED EMBODIMENTS

Figure 1:
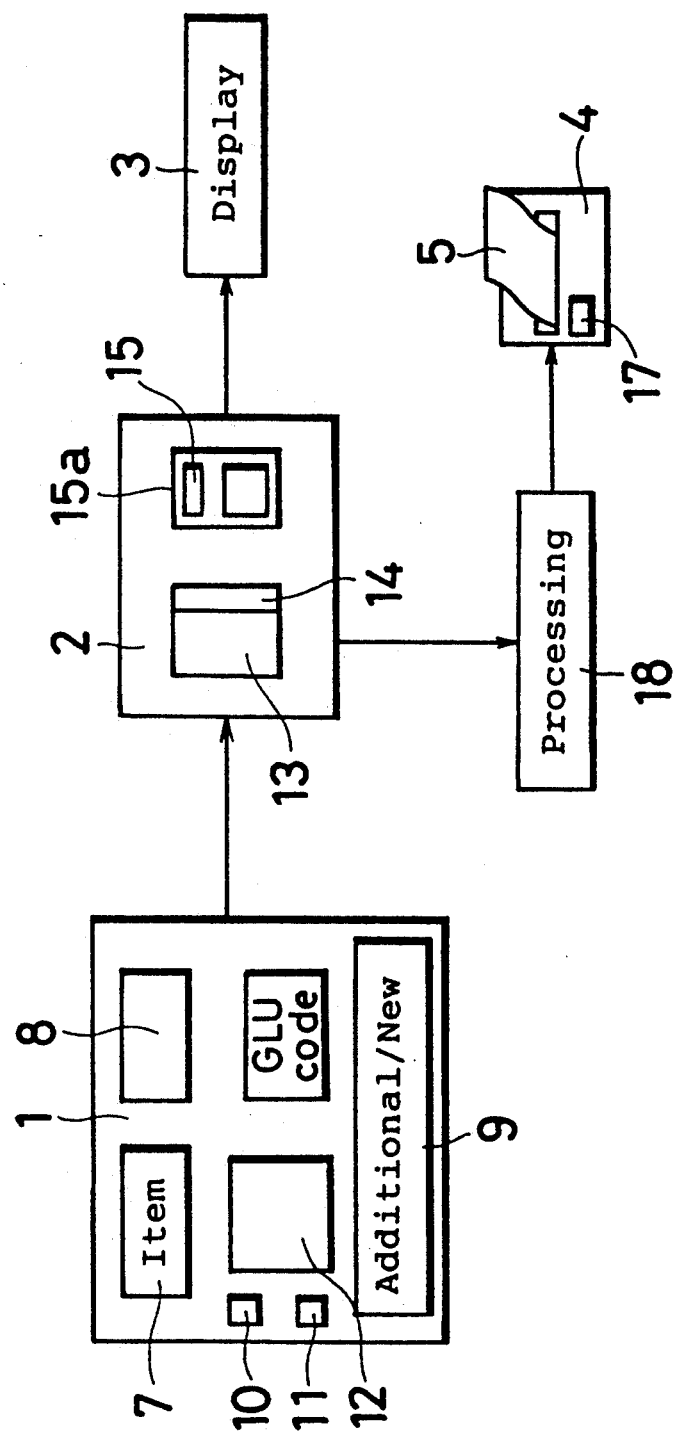
FIG. 1 is a block diagram of an embodiment of the invention.

Now referring to the drawings, preferred embodiments of the invention are described below.

FIG. 1 is a block diagram of a whole embodiment of the invention. Output of key input means is supplied to a processing circuit 2 implemented by a microcomputer and the like; monetary transaction information for each guest entered through the input means, its calculation result, and the like are displayed on visual display means 3 such as a CRT or the like; and a slip 5 such as a receipt, bill, or the like is issued by printing monetary transaction information on a recording sheet with printing means 4. Such an electronic cash register as this is used in a restaurant, for example.

The input means 1 is provided with keys 6 for entering a code (GLU code) to identify a guest, provided with keys 7 for registering items through entering an order in a restaurant or the like, provided with keys 8 for entering such means for payment as cash, credit card, check, or the like, provided with keys 9 for specifying a new or additional registration, and provided with a totalization key 10, temporary totalization key 11, and a function (for short, TL-status function) key 12 for keeping a temporary totalization state.

The processing circuit 2 as control means is provided with a memory 13, which is the first memory to store transaction information for a guest individually corresponding to an entered guest's GLU code, and is provided with a flag 14, which indicates whether the process is kept in a temporary totalization state, corresponding to each guest code. The first memory 13 is provided with a GLU file of a storing area for each guest, and the GLU file stores item data, a price of each item, and a total amount of money for the items. The second memory 15 is a totalization-related memory contained in a transaction memory 15a and stores a total amount of money and the like for monetary transaction of each guest.

Referring to FIG. 2(1), operation of the electronic cash register is described. In step n1 a guest's GLU code is entered by pressing the key 6 of the input means 1. In step n2 the processing circuit 2 determines whether or not the code entered in step n1 is a predetermined code, and if it is, the process goes to step n3 in which it is determined whether or not the code is for a new registration "NEW ORDER". If a new registration is specified by the key 9, the process goes from step n3 to step n4, in which it is determined whether or not the temporary totalization status hold "TL-STATUS" state is specified by pressing the key 12; and if it is not specified by the key 12, the process goes to step n5, in which processing for a new registration is performed. Namely, in step n5 a GLU file which is a storing area corresponding to a guest's GLU code entered in the memory 13 is created so that transaction data may be stored in it.

Referring to FIG. 2(3), in step n6, an item registration for an order or the like in a restaurant is made through the key 7. In step n7, the totalization key 10, temporary totalization key 11, or temporary totalization Status Hold key 12 is pressed. In step n8, it is determined whether or not the temporary totalization key 11 was pressed to allow the next guest to be registered; and if it was, the process goes to step n9, in which a temporary totalization processing is performed. This temporary totalization processing stores the registered item data into the GLU file which is a storing area for each guest. In step n10, a sequence of operations terminates.

In step n8 when it is determined that the temporary totalization key 11 has not been pressed, the process goes to step n11 shown in FIG. 2(4), and it is determined whether the temporary totalization status hold key 12 was pressed; and if it was not, it is determined that the totalization key 10 was pressed and then the totalization processing is performed in step n12. The totalization processing sums up an amount of money stored in a GLU file for each guest in the second memory 15 which is a totalization-related memory, and clears the item data of the corresponding guest's GLU code from the GLU file. After this, the process goes to step n14, in which a slip 5 for the guest is printed from the memory 17 containing data to be printed through the printing means 4. The memory 17 stores content of the GLU file to be printed, its total amount of money, its amount of a tax, and the like in it. When transaction information is stored in the GLU file which is a storing area for each guest, a flag corresponding to it is turned on.

In step n3 shown in FIG. 2(1), when the key 9 is pressed for an additional registration, the process goes to step n15 shown in FIG. 2(2), and it is determined whether or not the temporary totalization status holds key 12 has been pressed; and if the key 12 has not been pressed, then an additional registration is made in step n19. The additional registration processing reads data of the GLU code corresponding to the GLU file which is a storing area in the first memory 13.

After this the process goes to step n6.

If it is determined in step n15 that the temporary totalization status hold key 12 has been pressed, the process goes to step n16 and the data of the corresponding GLU code is read from the GLU file. Next the process goes to step n17, calculates back a total amount of money for each guest from data in the second memory 15 which is a totalization-related memory included in the transaction memory, and returns to the temporary totalization state. Namely, when it is assumed that a total amount in the GLU file of the corresponding GLU code is A and a total amount in the second memory 15 is B, a value C is obtained and the value C is stored in the second memory 15 as a total amount of money.

$$C = B - A \tag{1}$$

After this, the process goes to step n6.

If it is determined in step n4 that the temporary totalization Status Hold key 12 has been pressed, the process goes to step n18, and processing of a new order "NEW ORDER" is performed as the temporary totalization state is kept. Namely, the item data of the corresponding GLU code is cleared. After this the process goes to step n6, where an item registration processing is performed.

If it is determined in step n11 that the temporary totalization status hold key 12 has been pressed, the process goes to step n13, stores the item data of the corresponding GLU code in the GLU file of the first memory, and adds the data to a total amount of money for a guest in the second memory 15 which is a totalization-related memory included in the transaction memory.

If an entered code is not a predetermined code in step n2, it is handled as an error in step n20.

In the step n18, to clear the item data of the corresponding GLU code brings a state in which the next item registration can be made, so that registration for a new guest may be performed.

In this way, to make a totalization through pressing the Temporary Totalization Status Hold key 12 in step n7 allows an additional registration to be made even if a guest makes an additional order later for whose GLU code a totalization has been once made. Accordingly it is possible to issue a slip 5 on which the printing means 4 prints the item data and total amount of money including items of the additional order as well as the previous order.

The invention can be embodied not only in restaurants and the like, but also in other wide fields.

The invention may be embodied in other specific forms without departing the spirit or essential characteristics thereof. The present embodiments are therefore to be considered in all respects as illustrative and not restrictive, the scope of the invention being indicated by the appended claims rather than by foregoing description and all changes which come within the meaning and the range of equivalency of the claims are therefore intended to be embraced therein.

What is claimed is:

1. An electronic cash register comprising:
    input means for entering monetary transaction information for each guest;
    a first memory to store transaction information for each guest;
    a second memory to store a total amount of money for each guest;
    first specifying means for specifying a totalizing operation;
    second specifying means for specifying that the process is to be kept in a temporary totalization state;
    third specifying means for specifying an additional registration of monetary transaction information;
    and control means which (a) makes a monetary transaction processing by summing an amount of money stored in the first memory for one guest in response to output of the first specifying means, adds the sum to the data in the second memory, and then clears contents stored i the first memory, (b) makes a monetary transaction processing by summing an amount of money stored in the first memory for one guest in response to output of the second specifying means, adds the sum to the data in the second memory and keeps the data stored in the first memory, and (c) subtracts the sum obtained from the processing in the first memory for one guest rom the value stored in the second memory for the one guest in response to output of the third specifying means and makes an additional registration of transaction information from the input means on the first memory.

2. An electronic cash register as claimed in claim 1, wherein the input means is provided with guest code input keys to enter a code for identifying a guest and item registration keys to enter monetary transaction information, and
    the control means stores monetary transaction information entered by pressing the item registration key, corresponding to a guest code entered into the first memory by pressing the guest code input key in response to output of the input means.

3. An electronic cash register as claimed in claim 1, wherein the first memory contains a flag to indicate the transaction information for a guest is kept in the temporary totalization state;

the control means turns on the flag to indicate the temporary totalizing state is kept in response to output of the second specifying means, subtracts the obtained from the calculation in the first memory from a value stored in the second memory in response to output of the third specifying means when the flag is turned on in response to output of the third specifying means, and makes an additional registration of the transaction information from the input means on the first memory.

4. An electronic cash register as claimed in claim 1, wherein the electronic cash register is provided with means for printing on a slip both monetary transaction information for one guest stored in the first memory before specifying the temporary totalization state through the second specifying means and additional monetary transaction information stored in the first memory for the one guest after specifying an additional registration through the third specifying means.

* * * * *